(12) United States Patent
Petri et al.

(10) Patent No.: US 7,523,815 B2
(45) Date of Patent: Apr. 28, 2009

(54) CALIPER FOR A DISK BRAKE

(75) Inventors: Ralph Petri, Sulzbach (DE); Rolf Weiler, Eppstein (DE); Jürgen Balz, Hünstetten-Oberlibbach (DE); Michael Weidenweber, Frankfurt/M (DE)

(73) Assignee: Continental Teves AG & Co. oHG, Frankfurt (DE)

( * ) Notice: Subject to any disclaimer, the term of this patent is extended or adjusted under 35 U.S.C. 154(b) by 0 days.

(21) Appl. No.: 11/791,507

(22) PCT Filed: Nov. 25, 2005

(86) PCT No.: PCT/EP2005/056221

§ 371 (c)(1),
(2), (4) Date: May 24, 2007

(87) PCT Pub. No.: WO2006/056598

PCT Pub. Date: Jun. 1, 2006

(65) Prior Publication Data

US 2008/0135354 A1 Jun. 12, 2008

(30) Foreign Application Priority Data

Nov. 26, 2004 (DE) .................. 10 2004 057 276
Nov. 23, 2005 (DE) .................. 10 2005 056 166

(51) Int. Cl.
*F16D 65/56* (2006.01)
(52) U.S. Cl. ..................... 188/71.9; 188/72.6
(58) Field of Classification Search ............... 188/72.2, 188/72.4, 72.6, 72.8, 72.9, 196 M, 196 V
See application file for complete search history.

(56) References Cited

U.S. PATENT DOCUMENTS

| 3,638,763 | A | * | 2/1972 | Laverdant | 188/72.6 |
| 5,060,765 | A | * | 10/1991 | Meyer | 188/71.9 |
| 5,609,227 | A | * | 3/1997 | Mery | 188/72.7 |
| 5,788,024 | A | * | 8/1998 | Meyer | 188/72.7 |
| 5,868,225 | A | * | 2/1999 | Hulliger | 188/72.4 |
| 6,279,690 | B1 | * | 8/2001 | Schaffer | 188/71.9 |

(Continued)

FOREIGN PATENT DOCUMENTS

EP 0 403 635 B1 12/1990

(Continued)

*Primary Examiner*—Christopher P Schwartz
(74) *Attorney, Agent, or Firm*—RatnerPrestia

(57) ABSTRACT

A brake caliper of a disc brake includes a housing with a bore, in which a piston is arranged in an axially displaceable fashion, a shaft for actuation, which is mounted in a rotatable and axially displaceable fashion, two ramp elements being rotatable in relation to each other, a readjusting device with a spindle, and an axial bearing that is active between the shaft and the spindle. A generic brake caliper of a disc brake includes components having a construction to withstand stress so that they are exposed to even, low stress without detrimental tension peaks. A toothing is provided on a circumference of the spindle, and a form-fit accommodation means for the toothing is provided. The accommodation means are unrotatably connected to the housing and secure the spindle against twisting. A calotte arrangement is also provided as an axial bearing, which comprises a calotte shell with a concavely curved surface and a calotte pivot with a convexly curved surface.

16 Claims, 4 Drawing Sheets

U.S. PATENT DOCUMENTS

| | | |
|---|---|---|
| 6,651,784 B1 * | 11/2003 | Barbosa et al. ............ 188/71.9 |
| 6,659,236 B1 * | 12/2003 | Clark et al. .............. 188/79.52 |
| 7,331,432 B2 * | 2/2008 | Watada ...................... 188/72.7 |
| 2002/0041123 A1 | 4/2002 | Runkel et al. |
| 2002/0041223 A1 | 4/2002 | Runkel et al. |
| 2003/0164271 A1 * | 9/2003 | Boisseau ................... 188/72.7 |

FOREIGN PATENT DOCUMENTS

| | | |
|---|---|---|
| GB | 2 155 126 A | 9/1985 |
| WO | WO 03/023247 A1 | 3/2003 |

* cited by examiner

CALIPER FOR A DISK BRAKE

RELATED APPLICATIONS

This application is the U.S. national phase application of PCT International Application No. PCT/EP2005/056221, filed Nov. 25, 2005, which claims priority to German Patent Application No. DE102004057276.3, filed Nov. 26, 2004 and German Patent Application No. DE102005056166.7, filed Nov. 23, 2005, the contents of such applications being incorporated by reference herein.

FIELD OF THE INVENTION

The present invention relates generally to brake calipers, and in particular to a brake caliper with components constructed so that the caliper is subject to an even, low stress without detrimental stress peaks.

BACKGROUND OF THE INVENTION

EP 0 403 635 B1 discloses a combined brake caliper of this type for use in a motor vehicle disc brake. The brake caliper comprises a housing with a bore, in which a piston is arranged in a displaceable fashion for brake application. A shaft is pivoted in the brake housing for parking brake operations, and the shaft extends through the brake housing and is connected to a ramp element of a ramp arrangement. A second associated ramp element is arranged formed fast with the housing.

Due to the connection of shaft and ramp arrangement, the shaft will perform a rotation and an axial displacement when the parking brake is operated. The shaft transmits the axial displacement to a spindle of a readjusting device, and an axial bearing is interposed between the shaft and the spindle in order to uncouple the translation from the rotation. The axial displacement is transmitted to the piston by way of the readjusting device. To convert the rotation into an axial movement, the spindle of the readjusting device must be supported in tangential direction in the housing using a cartridge of the readjusting device. This anti-rotation safeguard is required because the axial bearing transmits a residual torque into the spindle.

In this arrangement, the cartridge is unrotatably coupled to the ramp arrangement on the housing and includes three longitudinal slots, in which the spindle is supported tangentially by means of three projections. It is disadvantageous in this respect that considerable surface pressures and tension peaks occur at the edges of the slots and at the projections of the spindle, and that this uneven component stress leads to an increase in wear. The longitudinal slots cause low stability of the cartridge, thus necessitating a major wall thickness of the cartridge.

To relieve the components of the anti-rotation safeguard from stress, it is disclosed to design the axial bearing between shaft and spindle as a rolling or slide bearing. The use of a rolling bearing allows achieving introduction of low torque into the anti-rotation safeguard. Since rolling bearings are cost-intensive, increase the complexity of components and require hardening of the respective sliding surfaces, this solution entails high costs of manufacture and is, therefore, considered not practicable. Compared thereto, a slide bearing with an axially active slide bearing plate brings about cost benefit, yet causes increased component tension in the readjusting device due to the higher bearing friction. Based on the above, it is desirable to have a generic brake caliper of a disc brake, with the components having a construction to withstand stress so that they are exposed to even, low stress without detrimental tension peaks.

SUMMARY OF THE INVENTION

The present invention relates to a brake caliper of a disc brake, comprising a housing with a bore in which a piston is arranged in an axially displaceable fashion, and a shaft for actuation, which is mounted in a rotatable and axially displaceable fashion and extends with a shaft end through a housing opening, and two ramp elements being rotatable in relation to each other, one ramp element thereof being connected unrotatably to the housing, and one ramp element being connected unrotatably to the shaft, and a readjusting device with a spindle, with the readjusting device being provided between the shaft and the piston, and an axial bearing that is active between the shaft and the spindle.

According to the invention, a toothing is provided on a circumference of the spindle, and a form-fit accommodation means for the toothing is provided, with the accommodation means being unrotatably connected to the housing and securing the spindle against twisting. This way, the tangential forces over the entire circumference of the spindle are diverted into the accommodation, whereby low surface pressure in the accommodation is achieved. Because no slots are provided, no disadvantageous notch root tensions will develop.

A favorable embodiment of the invention covers the teaching that the toothing and the spindle are of integral design, resulting in a simplification of manufacture and assembly.

It has shown that tension peaks can be avoided because the teeth of the toothing are provided uniformly and circumferentially on an end portion in order to form a star-like cross-section. The uniform, star-like geometry of the supporting teeth causes the circumferential forces to be distributed evenly onto all teeth, the stress level being minimized as a result.

The above-mentioned advantage of the uniform component stress is also achieved for the accommodations means, when the form-fit accommodation means have a negative profile with respect to the star-like cross-section of the end portion. In a particularly advantageous embodiment of the invention, the accommodation means are configured integrally in a cartridge of the readjusting device. Configuring the cartridge as a star-like accommodation reinforces it, instead of losing inner stability on account of the supporting slots as is the case in the state of the art. This allows reducing the wall thickness of the cartridge and likewise obviates the need for a separate manufacturing process to make the slots.

Advantages in terms of manufacture are achieved in addition when the cartridge is manufactured by means of non-cutting manufacturing processes such as stamping, deep-drawing or pressing in particular.

It is, however, also feasible to manage without the use of a cartridge and to design the accommodation means integrally in a portion of the bore. This allows further reducing the number of components by realizing the tangential support directly by way of a suitable internal profile in the bore of the housing.

When a slide bearing is provided between spindle and shaft, according to another embodiment of the invention, its assembly is simplified in that an axially active slide bearing plate includes at least two opposed noses, with the noses engaging the profile of the accommodation means, whereby the slide bearing plate is centered.

According to an independent solution to the problem, a calotte arrangement is provided as an axial bearing, which comprises a calotte shell with a concavely curved surface and a calotte pivot with a convexly curved surface. This bearing concept is favorable in that the contact surface in the bearing is very small, with the result that friction is considerably diminished. This reduces the torque transmitted into the readjusting device, which results in a decrease of the forces developing in spindle and cartridge, and no excessive surface pressures and tension peaks develop therein. A favorable shaping of the surfaces implies that they are spherical.

This solution concept proves especially favorable when at least one concave radius can be associated with the surface of the calotte shell, while at least one convex radius can be associated with the surface of the calotte pivot, with the concave radius being larger than the convex radius.

It has been found in several tests that the desired function of the bearing is best satisfied when the convex radius of the calotte pivot amounts to a maximum of 95 percent of the size of the concave radius of the calotte shell. The lower this value, the lower the transmission resistance is, however, excessive surface pressures will be encountered in the contact surface of calotte pivot and calotte shell in this case. Once this value is exceeded, the bearing friction will systematically continue to increase, whereby the transmission resistance of the readjustment deteriorates.

When the calotte shell and an end portion of the spindle have an integral design, when the calotte shell is provided on an axial front surface of the end portion of the spindle, and the calotte pivot is integrally designed with an end portion of the shaft, the costs of manufacture and assembly will be considerably diminished because the manufacture of the components is simplified and their number is reduced.

The same applies to the design when the calotte shell and an end portion of the shaft have an integral design, and the calotte shell is provided on an axial front surface of the end portion of the shaft, and when the calotte pivot is shaped integrally with an end portion of the spindle.

The constellation of the individual components in the brake caliper according to the invention simplifies the assembly to a significant extent. This implies that a spring retainer is fixed to the cartridge by means of projecting lugs, and the cartridge is connected to the unrotatable ramp element by means of reshaped lugs so that cartridge, spring retainer and ramp element constitute an assembly unit.

The above constellation is particularly favorable as an assembly unit when the spring retainer includes projecting lugs, whereby the assembly unit can be fixed in recesses of the bore.

Further suitable detail features of the invention can be taken from the embodiment in the Figures, which will be explained more closely in the following.

BRIEF DESCRIPTION OF THE DRAWINGS

In the accompanying drawings.

DETAILED DESCRIPTION OF THE PREFERRED EMBODIMENTS

Figure 1:
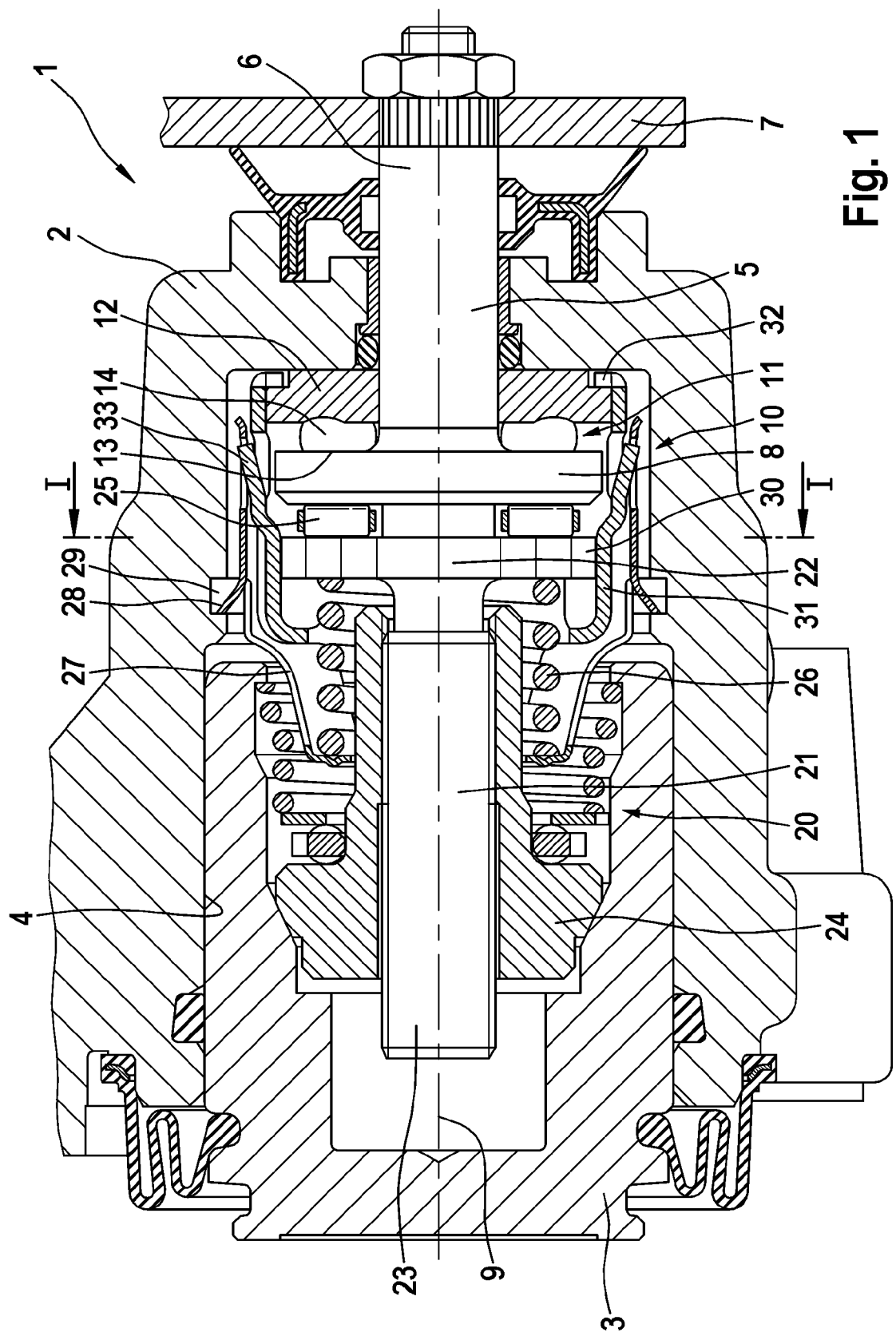
FIG. 1 is a cross-sectional view of a brake caliper with a readjusting and actuating device according to a first embodiment.

The brake caliper 1 of a motor vehicle disc brake illustrated in FIG. 1 comprises, among others, a housing 2, and a piston 3 that is displaceably arranged in a bore 4 for brake application. Piston 3 can be displaced by means of hydraulic pressurization in the case of a service brake operation. To realize a parking brake operation, a shaft 5 is provided, which permits displacing the piston 3 by way of an actuating device 10 inside bore 4. Shaft 5 extends with a shaft end 6, at which an operating lever 7 is fitted, through an opening in housing 2. The actuating device 10 acts upon piston 3 by the intermediary of a length-variable readjusting device 20.

The actuating device 10 comprises a ramp arrangement 11, which includes a ramp element 12 formed fast with the housing and a ramp element 13 being rotatable relative thereto. The ramp element 13 is designed integrally with a disc-shaped end portion 8 of shaft 5. Several roll bodies 14 are interposed between the ramp elements 12, 13 so that the ramp arrangement 10, upon mutual rotation of the ramp elements 12, 13, causes axial displacement of the shaft 5 in the actuating direction.

Interposed between the end portion 8 of shaft 5 and piston 3 is a length-variable readjusting device 20, which transmits the stroke of the ramp arrangement 11 to the piston 3 and automatically compensates wear of the non-illustrated brake pads and brake disc. The readjusting device 20 comprises, among others, a spindle 21 with an end portion 22 and a nut 24 that is screwed onto the shaft 23 of the spindle 21 and bears against the piston 3. An axial rolling bearing 25 is provided between the front surface of the spindle 21 and the end portion 8. A spring 26 biases the spindle 21 with respect to the bearing 25 by way of a spring retainer 27. By means of projecting lugs 28, the spring retainer 27 is supported axially and radially in recesses 29 in bore 4.

Figure 2:
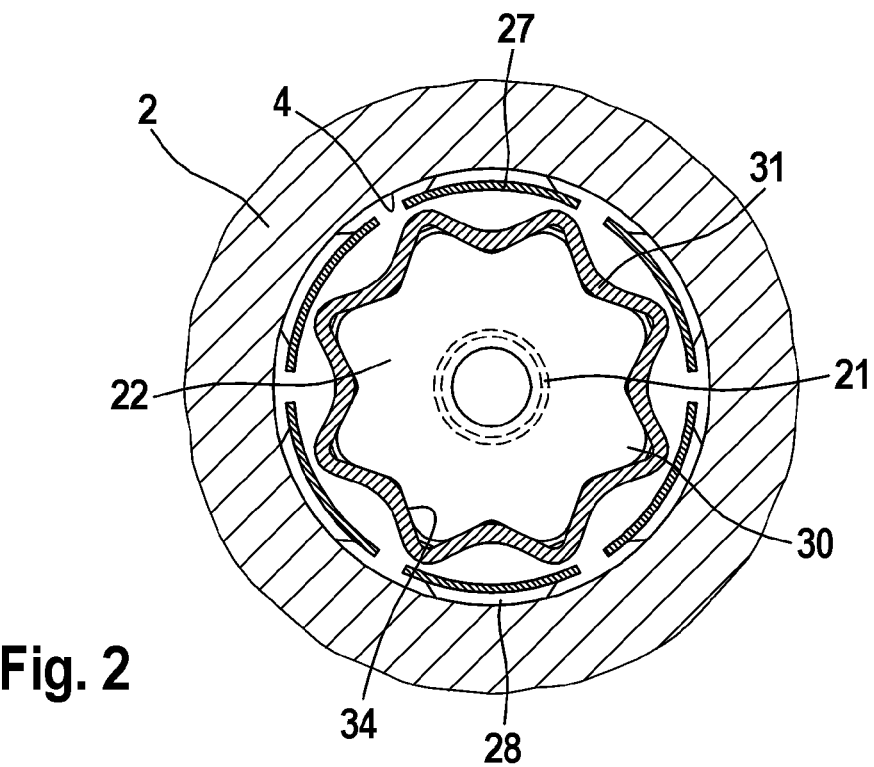
FIG. 2 is a partial cross-section of the brake caliper of FIG. 1 taken along line I-I.

Several regular teeth of the toothing 30 are provided on the circumference of an end portion 22 of the spindle 21 so that the end portion 22 has a star-like cross-section. In order to secure the spindle 21 against rotation, a cartridge 31 formed fast with the housing embraces the end portion 22. As the cartridge 31 at least partly has a star-like inside profile 34 that corresponds to the end portion 22, it engages the toothing 30, forming a form-locking engagement with the end portion 22 in a tangential direction (FIG. 2). Thus, the spindle 21 is displaceable in the actuating direction, yet is simultaneously received within the cartridge 31 and, thus, likewise in the brake caliper 1 in a fashion secured against rotation.

To provide an assembly unit that is easy to handle, the essential components of the mechanical actuating device 10 and the readjusting device 20 are grouped in a subassembly according to the invention. This is achieved by the cartridge 31 in connection with the spring retainer 27 and the ramp element 12, with these elements encompassing the individual components of the subassembly. The premountable subassembly comprises the ramp arrangement 11, the shaft 5, the axial bearing, the spindle 21, the spring 26 and the cartridge 31 as well as the spring retainer 27. Initially, the ramp arrangement 11, the bearing and the spindle 21 are mounted into the cartridge 31, which is subsequently closed with reshaped lugs 32 with the unrotatable ramp element 12, whereby the single parts are held captive in the cartridge 31. Thereafter, the spring retainer 27 along with the inward spring 26 can be locked at projecting lugs 33 with the cartridge 31. The resulting preassembled unit can be handled separately and, after its insertion into bore 4, will get hooked in recesses 29 in the brake caliper 1 by way of additional projecting lugs 28 of the spring retainer 27.

Figure 3:
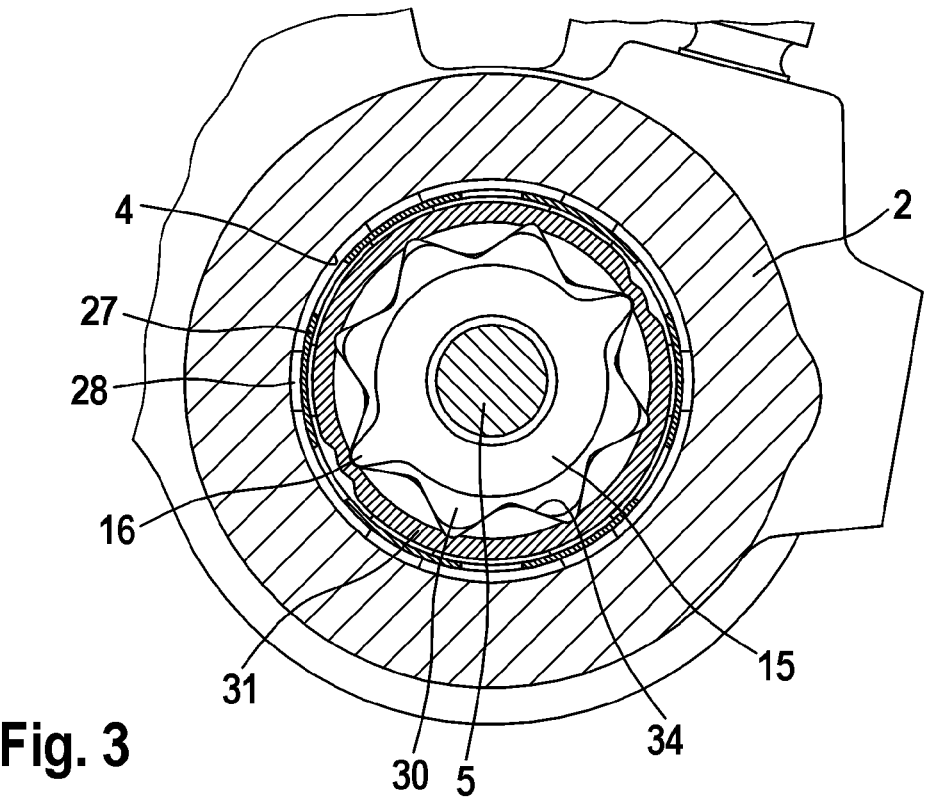
FIG. 3 is a cross-sectional view of another embodiment of a brake caliper, like in FIG. 2, wherein a slide bearing plate is used instead of a rolling bearing.
Figure 4:
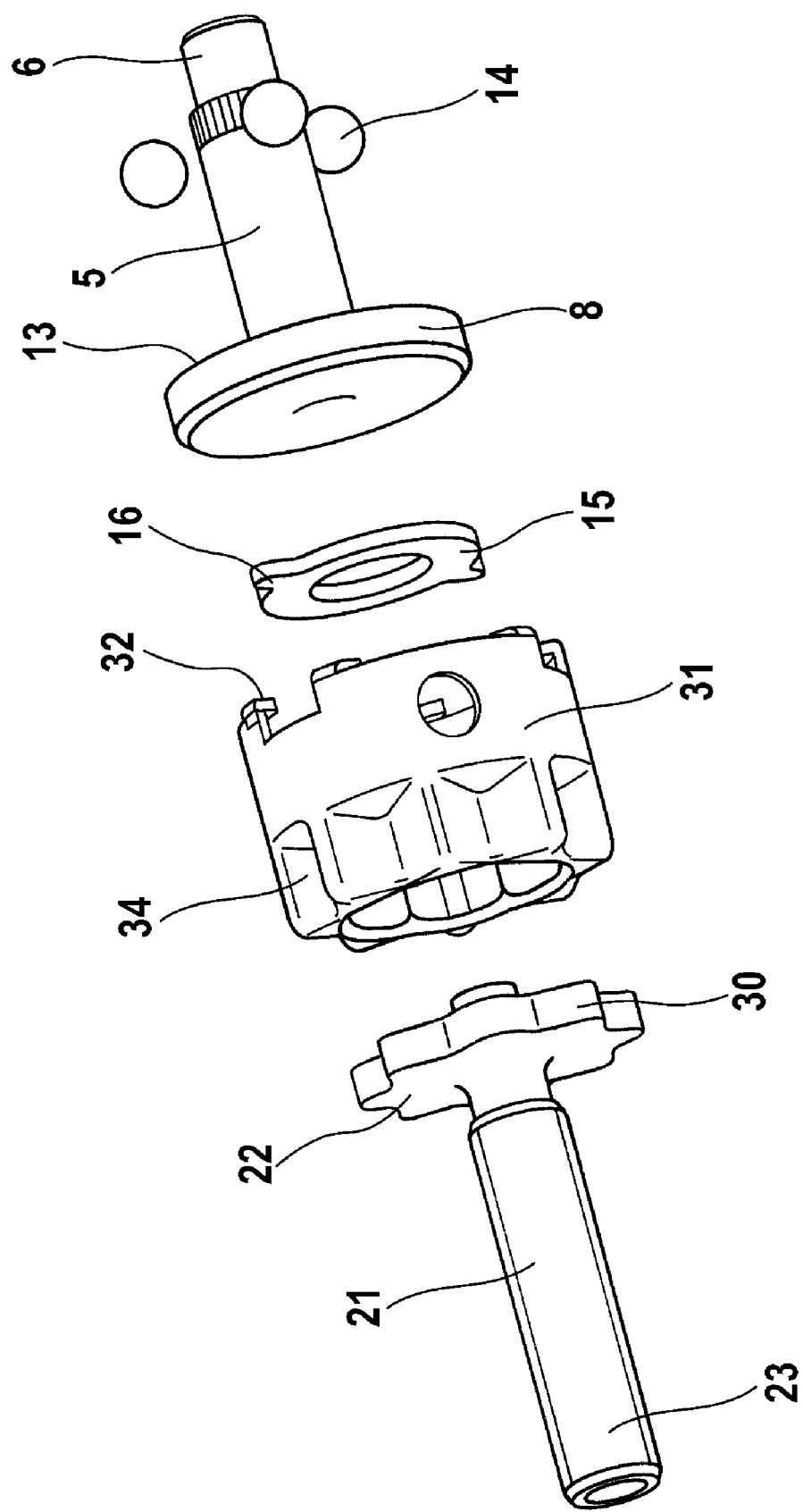
FIG. 4 is an explosive view of the embodiment according to FIG. 3.

FIGS. 3 and 4 display another embodiment of the invention. In this arrangement, a slide bearing plate 15, instead of the rolling bearing 25, is used between the end portion 8 of the shaft 5 and the spindle 21. Plate 15 is provided on its circumference with two opposed noses 16, which engage the star-like profile 34 of the cartridge 31. The slide bearing plate 15 is centered this way. This embodiment, in which a housing cover closes a through-hole in the housing, discloses an assembly unit, comprising a housing cover, a cartridge, a spring retainer with spring, a ramp arrangement, a spindle, a bearing and a shaft, which has been described in detail in the applicant's patent application DE 10 2005 0084254 that has not yet been published. Express reference is made herein to the disclosure relating to the arrangement and assembly.

The sequence of functions of the parking brake operation in the brake caliper 1 of FIG. 1 will be presented in the following. When the parking brake is operated, the operating lever 7 is used to turn the shaft 5 and the end portion 8, and to twist the ramp arrangement 11. Thus, the two ramp elements 12 and 13 bring about axial displacement of the shaft 5 and the end portion 8. This axial displacement is transmitted onto the end portion 22 or the spindle 21, respectively, by means of the axial bearing 25. As the spindle 21 is guided in the cartridge 31 in an unrotatable fashion by way of the toothing 30 of the end portion 22, the spindle 21 exclusively performs an axial displacement without rotation. Thus, the piston 3 is moved by way of the nut 24 screwed onto the shank 23 and blocks the brake disc (not shown).

Figure 5:
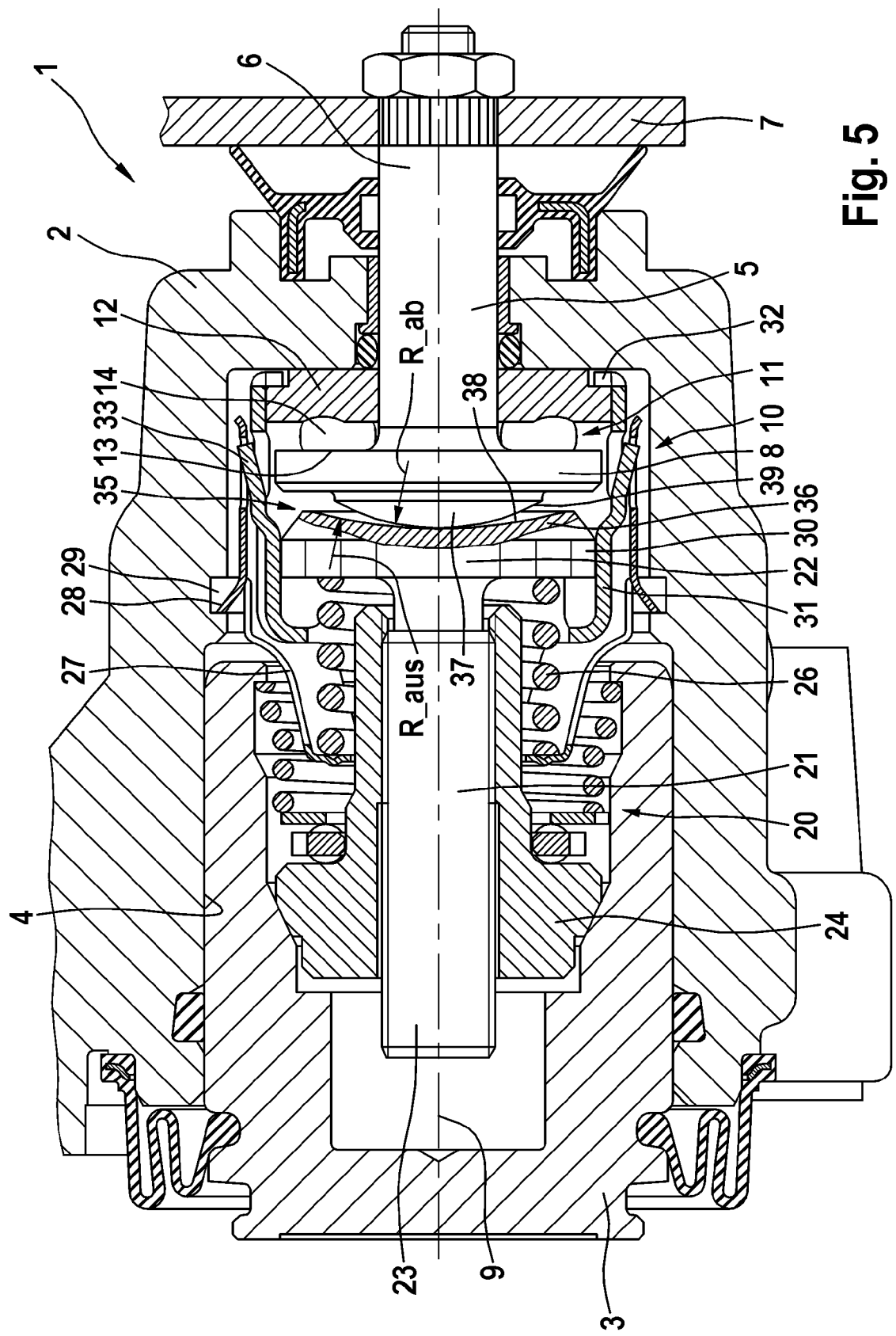
FIG. 5 is a cross-sectional view of a brake caliper with a readjusting and actuating device according to another constructive solution.

FIG. 5 illustrates a cross-sectional view of a brake caliper with a readjusting and actuating device according to another constructive solution. Herein, the problems of excessive component stress of the cartridge of the readjusting device, which was been described in the state of the art and is due to the high friction in the slide bearing, is circumvented by using a bearing with extremely low friction. A calotte arrangement 35 is employed in this case, which comprises a calotte shell 36 with a concavely curved surface 38 and a calotte pivot 37 with a convexly curved surface 39.

The bearing 35 is realized in such a way that the calotte shell 36 serving to accommodate the calotte pivot 37 is provided on the end portion 22 of the spindle 21. Calotte pivot 37 is placed on the front surface of the end portion 8 of the shaft 5. The axial surface 39 of the calotte pivot 37 has a spherical design and exhibits a constant convex radius $R\_ab$ everywhere. In correlation thereto, the receiving surface 38 of the calotte shell 36, in which the calotte pivot 37 abuts with the spherical surface 39, is also provided with a constant concave radius $R\_aus$. To allow the calotte pivot 37 to extend into the calotte shell 36, the convex radius $R\_ab$ of the calotte pivot 37 is smaller than the concave radius $R\_aus$ of the calotte shell 36, in particular, the convex radius amounts to 89 percent of the size of the concave radius, or it can be inferior, or it can increase until 95%. The greater the difference between the radii, the lower the friction between pivot 37 and calotte 36 will be, however, the surface pressure in the contact point will rise as a result.

The invention claimed is:

1. A brake caliper of a disc brake, comprising:
   a housing with a bore in which a piston is arranged in an axially displaceable fashion;
   a shaft for actuation, which is mounted in a rotatable and axially displaceable fashion and extends with a shaft end through a housing opening;
   two ramp elements being rotatable in relation to each other, one ramp element thereof being connected unrotatably to the housing, and one ramp element being connected unrotatably to the shaft;
   a readjusting device with a spindle comprising a toothing, the toothing comprising an array of teeth arranged around the perimeter of the spindle and extending radially outwardly from the spindle, with the readjusting device being provided between the shaft and the piston; and
   an axial bearing that is active between the spindle and the shaft,
   wherein a form-fit accommodation means for the toothing is provided, with the accommodation means being unrotatably connected to the housing and securing the spindle against rotation.

2. The brake caliper as claimed in claim 1, wherein the teeth of the toothing are provided uniformly and circumferentially on an end portion in order to form a star-like cross-section.

3. The brake caliper as claimed in claim 2, wherein the form-fit accommodation means has a negative profile with respect to the star-like cross-section of the end portion.

4. The brake caliper as claimed in claim 3, further comprising an axially active slide bearing plate, wherein the axially active slide bearing plate includes at least two opposed noses, with the noses engaging the profile of the accommodation means, whereby the slide bearing plate is centered.

5. The brake caliper as claimed in claim 1, wherein the accommodation means are configured integrally in a cartridge of the readjusting device.

6. The brake caliper as claimed in claim 5, wherein the cartridge is manufactured by means of non-cutting manufacturing processes such as stamping, deepdrawing or pressing.

7. The brake caliper as claimed in claim 1, wherein the toothing and the spindle are of integral design.

8. The brake caliper as claimed in claim 1, wherein the accommodation means is designed integrally in a portion of the bore.

9. The brake caliper as claimed in claim 1, wherein a spring retainer is fixed to the cartridge by means of projecting lugs, and the cartridge is connected to the unrotatable ramp element by means of reshaped lugs so that cartridge, spring retainer and ramp element constitute an assembly unit.

10. A brake caliper of a disc brake, comprising:
    a housing with a bore in which a piston is arranged in an axially displaceable fashion;
    a shaft for actuation, which is mounted in a rotatable and axially displaceable fashion and extends with a shaft end through a housing opening;
    two ramp elements being rotatable in relation to each other, one ramp element thereof being connected unrotatably to the housing, and one ramp element being connected unrotatably to the shaft;
    a readjusting device with a spindle, with the readjusting device being provided between the shaft and the piston; and
    an axial bearing that is active between the spindle and the shaft,
    wherein a calotte arrangement is provided as an axial bearing, which comprises a bowl-shaped calotte shell with a concavely curved surface and a bowl-shaped calotte pivot with a convexly curved surface.

11. The brake caliper as claimed in claim 10, wherein at least one concave radius ($R\_aus$) can be associated with the concavely curved surface, while at least one convex radius ($R\_ab$) can be associated with the convexly curved surface, with the concave radius ($R\_aus$) being larger than the convex radius ($R\_ab$).

12. The brake caliper as claimed in claim 11, wherein the convex radius ($R\_ab$) amounts to a maximum of 95 percent of the size of the concave radius ($R\_aus$).

13. The brake caliper as claimed in claim 10, wherein the surface of the calotte pivot and the surface of the calotte shell are spherical.

14. The brake caliper as claimed in claim 10, wherein the calotte shell and an end portion of the spindle have an integral design, and the calotte shell is provided on an axial front surface of the end portion of the spindle, and in that the calotte pivot is integrally designed with an end portion of the shaft.

15. The brake caliper as claimed in claim 10, wherein the calotte shell and an end portion of the shaft have an integral design, and the calotte shell is provided on an axial front surface of the end portion of the shaft, and in that the calotte pivot is shaped integrally with an end portion of the spindle.

16. The brake caliper as claimed in claim 10, wherein the spring retainer includes projecting lugs, whereby the assembly unit can be fixed in recesses of the bore.

\* \* \* \* \*